US010574122B2

(12) United States Patent
Perry et al.

(10) Patent No.: US 10,574,122 B2
(45) Date of Patent: Feb. 25, 2020

(54) METHOD OF FORMING A ROTOR (71) Applicant: GM GLOBAL TECHNOLOGY OPERATIONS LLC, Detroit, MI (US)

(72) Inventors: Thomas A. Perry, Bruce Township, MI (US); James G. Schroth, Troy, MI (US); Sean R. Wagner, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 565 days.

(21) Appl. No.: 15/404,433

(22) Filed: Jan. 12, 2017

(65) Prior Publication Data

US 2018/0198352 A1  Jul. 12, 2018

(51) Int. Cl.
*H02K 15/02* (2006.01)
*H02K 15/03* (2006.01)
*C23C 8/26* (2006.01)
*C23C 8/50* (2006.01)
*C23C 8/38* (2006.01)
*C21D 7/06* (2006.01)
*C21D 9/00* (2006.01)
*C21D 6/00* (2006.01)
*H02K 1/27* (2006.01)
*C23C 8/32* (2006.01)

(52) U.S. Cl.
CPC .............. *H02K 15/03* (2013.01); *C21D 6/008* (2013.01); *C21D 7/06* (2013.01); *C21D 9/0068* (2013.01); *C23C 8/26* (2013.01); *C23C 8/32* (2013.01); *C23C 8/38* (2013.01); *C23C 8/50* (2013.01); *H02K 1/2766* (2013.01); *Y10T 29/49009* (2015.01); *Y10T 29/49012* (2015.01)

(58) Field of Classification Search
CPC ......... Y10T 29/49012; Y10T 29/49009; Y10T 29/5184; H02K 15/03; H02K 15/0012; H02K 15/02; H02K 1/27; H02K 1/276; H02K 2201/06
USPC .................. 29/598, 596, 607, 609, 732, 738
See application file for complete search history.

(56) References Cited

U.S. PATENT DOCUMENTS 6,369,478 B1 * 4/2002 Koharagi ............... H02K 1/276
310/156.23
6,891,297 B2 * 5/2005 Shimada .............. H02K 1/2766
310/152

* cited by examiner

*Primary Examiner* — Thiem D Phan
(74) *Attorney, Agent, or Firm* — Quinn IP Law (57) ABSTRACT

A method of forming a rotor includes isolating a bridge area of an electrical steel lamination. The bridge area is disposed between a first portion of the electrical steel lamination and a second portion of the electrical steel lamination that is adjacent to the first portion. Each of the first portion, the second portion, and the bridge area has an initial hardness, and the electrical steel lamination has an initial magnetic permeability. After isolating, the method includes hardening only the bridge area so that the bridge area has a treated hardness that is greater than the initial hardness. Concurrent to hardening, the method includes decreasing the initial magnetic permeability at only the bridge area.

18 Claims, 4 Drawing Sheets

METHOD OF FORMING A ROTOR

INTRODUCTION

The present disclosure generally relates to a rotor and a method of forming the rotor.

Electromagnetic machines such as electric motors, generators, and traction motors are useful for converting energy from one form to another. Such electromagnetic machines often include an element rotatable about an axis of rotation. The rotatable element, i.e., the rotor, may be coaxial with a static element, i.e., a stator, and energy may be converted via relative rotation between the rotor and stator.

In one configuration, the stator may include a series of copper coils that are energizable to generate magnetic flux. Further, the rotor may be mounted within the stator and may be formed from a stack of electrical steel laminations that each define several slots. One type of electromagnetic machine, an interior permanent magnet motor, includes magnets inserted into the several slots and arranged parallel to the axis of rotation. During operation, north and south poles of each magnet alternatingly align with the magnetic flux to rotate the rotor and generate torque.

SUMMARY

A method of forming a rotor includes isolating a bridge area of an electrical steel lamination. The bridge area is disposed between a first portion of the electrical steel lamination and a second portion of the electrical steel lamination that is adjacent to the first portion. Each of the first portion, the second portion, and the bridge area has an initial hardness. Further, the electrical steel lamination has an initial magnetic permeability. After isolating, the method includes hardening only the bridge area so that the bridge area has a treated hardness that is greater than the initial hardness. The method also includes, concurrent to hardening, decreasing the initial magnetic permeability at only the bridge area.

For the method, isolating may include masking off the first portion and the second portion from the bridge area. In one aspect, the method may include, concurrent to hardening, maintaining the initial hardness of the first portion and the second portion. In another aspect, the method may include, concurrent to decreasing, maintaining the initial magnetic permeability at the first portion and the second portion.

In one example, hardening may include increasing a yield strength and an ultimate tensile strength of only the bridge area. In another example, hardening may include nitriding only the bridge area. In a further example, hardening may include nitrocarburizing only the bridge area. Hardening may alternatively include peening only the bridge area. In yet another example, hardening may include impinging a plurality of ions with the contact surface at only the bridge area.

Further, the electrical steel lamination may have an interior edge and an outer edge spaced apart from the interior edge, and the electrical steel lamination may define a slot therethrough between the interior edge and the outer edge. In another example, hardening may include strengthening the bridge area at an end of the slot. In yet another example, hardening may include strengthening the bridge area along a periphery of the slot.

In an exemplary aspect, the electrical steel lamination may have a contact surface and the method may further include applying a reactive material to the contact surface at only the bridge area. The method may further include, after applying, thermally activating the reactive material. The method may also include preventing a transformation from ferrite to austenite at the first portion and the second portion.

In another aspect, the method includes isolating a first bridge area of a first electrical steel lamination, wherein the bridge area is disposed between a first portion of the first electrical steel lamination and a second portion of the first electrical steel lamination that is adjacent to the first portion. Each of the first portion, the second portion, and the first bridge area has a first initial hardness. Further, the first electrical steel lamination has a first initial magnetic permeability. The method also includes isolating a second bridge area of a second electrical steel lamination, wherein the second bridge area is disposed between a third portion of the second electrical steel lamination and a fourth portion of the second electrical steel lamination that is adjacent to the third portion. Each of the third portion, the fourth portion, and the second bridge area has a second initial hardness, and the second electrical steel lamination has a second initial magnetic permeability. After isolating the first bridge area and the second bridge area, the method includes hardening only the first bridge area and the second bridge area so that the first bridge area has a first treated hardness that is greater than the first initial hardness and the second bridge area has a second treated hardness that is greater than the second initial hardness. The method further includes, concurrent to hardening, decreasing the first initial magnetic permeability at only the first bridge area and decreasing the second initial magnetic permeability at only the second bridge area.

In one example, the method may further include, after hardening, stacking the first electrical steel lamination adjacent and in contact with the second electrical steel lamination. In another example, the method may include, prior to hardening, stacking the first electrical steel lamination adjacent and in contact with the second electrical steel lamination.

In a further example, the method may also include, isolating a third bridge area of a third electrical steel lamination, wherein the third bridge area is disposed between a fifth portion of the third electrical steel lamination and a sixth portion of the third electrical steel lamination that is adjacent to the fifth portion. Each of the fifth portion, the sixth portion, and the third bridge area may have a third initial hardness. The method may further include maintaining the third initial hardness of the third bridge area by not hardening any of the fifth portion, the sixth portion, and the third bridge area, and stacking the third electrical steel lamination between the first electrical steel lamination and the second electrical steel lamination.

A rotor includes an electrical steel lamination having an interior edge and an outer edge spaced apart from the interior edge. The electrical steel lamination defines a slot therethrough and has a first portion and a second portion that is adjacent to the first portion. Each of the first portion and the second portion has an initial hardness. The first electrical steel lamination also has a bridge area that is disposed between the first portion and the second portion. The bridge area has a treated hardness that is greater than the initial hardness. The rotor further includes a magnet disposed within the slot.

In one aspect, the electrical steel lamination may have an initial magnetic permeability, and only the bridge area may have a treated magnetic permeability that is less than the initial magnetic permeability.

The above features and advantages and other features and advantages of the present disclosure are readily apparent from the following detailed description of the best modes for carrying out the disclosure when taken in connection with the accompanying drawings.

DETAILED DESCRIPTION

Figure 1:
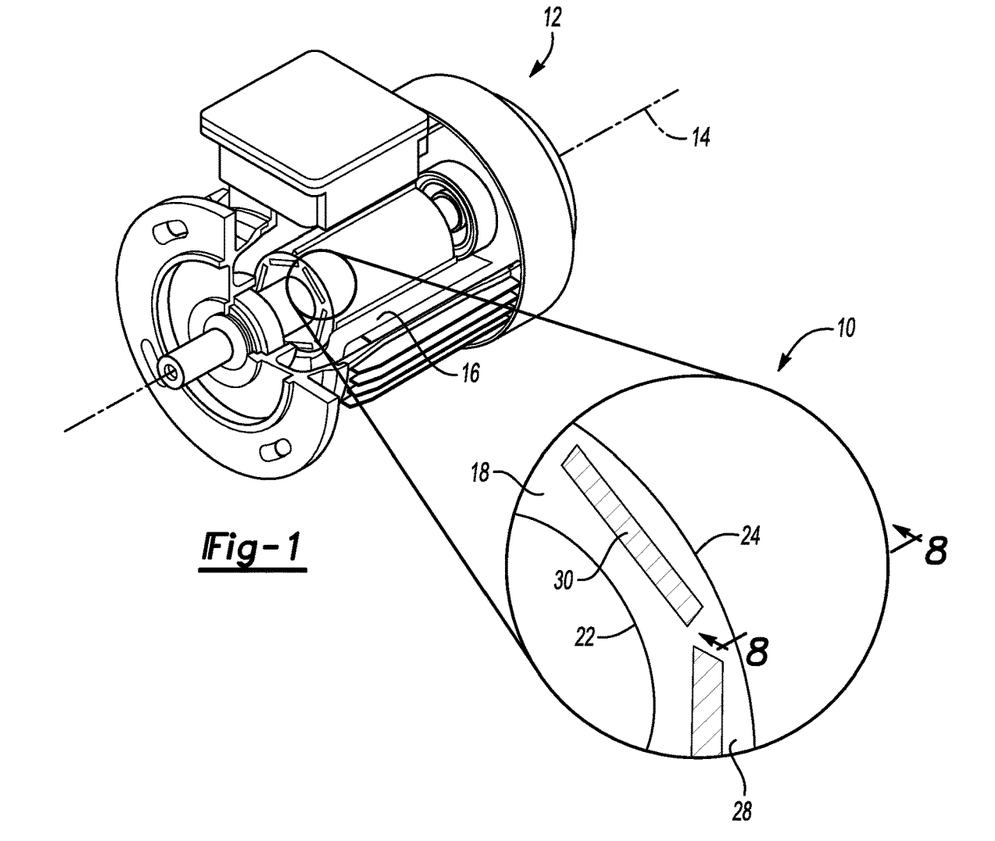
FIG. 1 is a schematic illustration of a perspective view of an electromagnetic machine that includes a stator and a rotor, wherein the rotor includes a lamination stack formed from a plurality of electrical steel laminations.

Referring to the Figures, wherein like reference numerals refer to like elements, a rotor 10 is shown generally in FIG. 1. The rotor 10 may be useful for an electromagnetic machine 12 for automotive applications, including an internal permanent magnet motor. However, the rotor 10 may also be useful for non-automotive applications, such as generators, electric motors, appliances, high-torque machinery, lifts, and the like for residential, industrial, and commercial applications.

By way of general explanation and described with reference to FIG. 1, the rotor 10 may be rotatable about an axis 14 of rotation and may rotate with respect to a stationary stator 16 of the electromagnetic machine 12. Further, the rotor 10 may include a generally cylindrical core or lamination stack 18. The lamination stack 18 may be formed from individual annular layers of electrical steel lamination (best shown at 20, 120, 220 in FIGS. 8 and 9), e.g., silicon steel or electrical steel, stacked adjacent one another. Further, as shown in FIG. 1, each electrical steel lamination 20 may have an interior edge 22 and an outer edge 24 spaced apart from the interior edge 22. The electrical steel lamination 20 defines a slot 26 therethrough between the interior edge 22 and the outer edge 24. More specifically, the electrical steel lamination 20 may define a plurality of slots 26. Therefore, when the individual annular layers of electrical steel lamination 20 are stacked adjacent one another to form the lamination stack 18, the electrical steel laminations 20 may align to define the plurality of slots 26 spaced about a periphery 28 (FIG. 1) of the lamination stack 18. The plurality of slots 26 may be parallel to the axis 14 of rotation and may each be configured to receive a magnet 30, as shown in FIG. 1. Further, although not shown, the plurality of slots 26 may be arranged in a skewed configuration about the axis 14 of rotation.

Figure 2A:
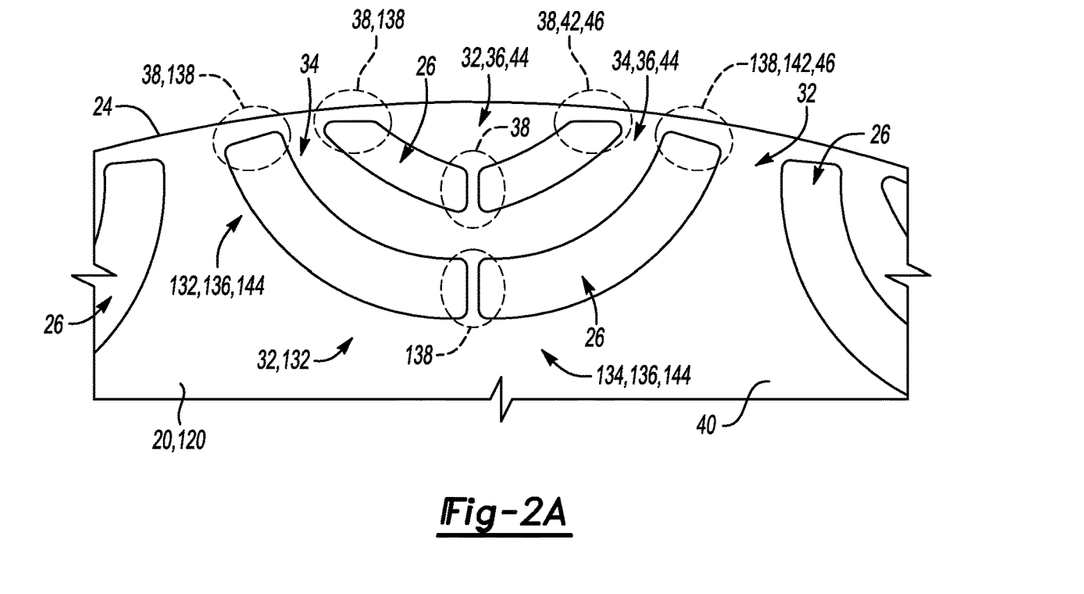
FIG. 2A is a schematic illustration of a top view of a portion of one of the plurality of electrical steel laminations of FIG. 1.

Therefore, with continued reference to FIG. 2A, the electrical steel lamination 20 has a first portion 32 and a second portion 34 that is adjacent to the first portion 32, and each of the first portion 32 and the second portion 34 has an initial hardness (represented by 36). As used herein, the term hardness refers to a mechanical hardness of the electrical steel lamination 20, as measured by, for example, the Rockwell B hardness scale, unless otherwise specified. The electrical steel lamination 20 also has a bridge area (represented generally at 38) that is disposed between the first portion 32 and the second portion 34. The bridge area 38 may be comparatively smaller and/or thinner than the first portion 32 and/or the second portion 34. That is, the bridge area 38 may form a boundary or divider or web between the first portion 32 and the second portion 34 and may have a minimal width to ensure excellent magnetic properties and performance of the electrical steel lamination 20.

Figure 2B:
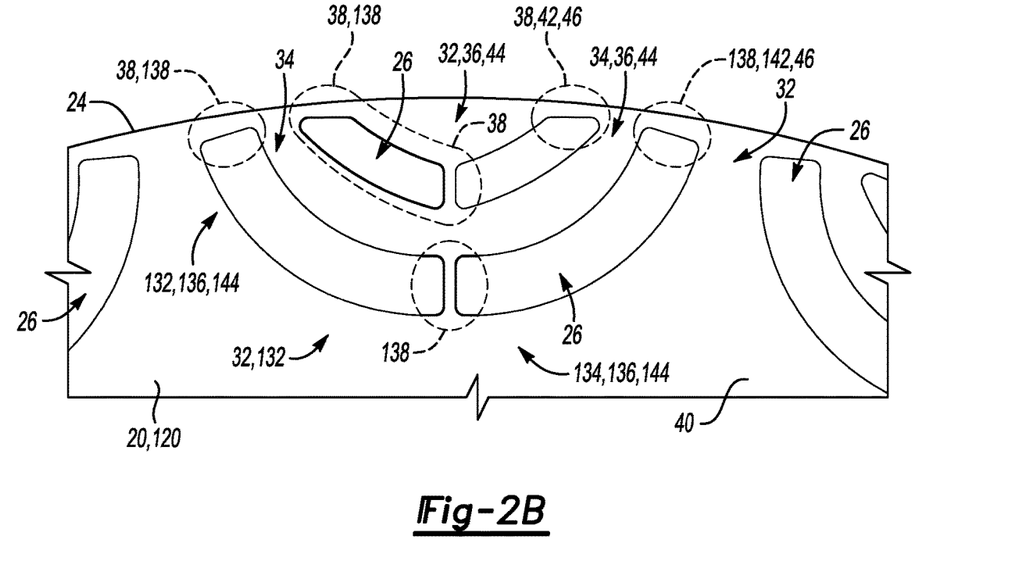
FIG. 2B is a schematic illustration of a top view of a portion of another example of one of the plurality of electrical steel laminations of FIG. 1.

Referring now to FIG. 2B, in another example, the bridge area 38 may surround the slot 26 along a periphery (denoted by a thick line weight in FIG. 2B) and separate the first portion 32 from the second portion 34. In this configuration, the first portion 32 may be, for example, proximate to the outer edge 24 and the second portion 34 may be disposed between the interior edge 22 and the outer edge 24. Alternatively, as also shown in FIG. 2B, the bridge area 38 may surround only a portion of the slot 26, e.g., an end (denoted by a thick line weight in FIG. 2B) of the slot 26 or a middle of the slot 26.

Further, in the configuration of FIG. 2A, the first portion 32, the second portion 34, and the bridge area 38 may define the slot 26, and the magnet 30 (FIG. 1) may be disposed within the slot 26 during operation of the rotor 10. In the configuration of FIG. 2B, the bridge area 38 may surround at least a portion of the slot 26. The electrical steel lamination 20 may also have a contact surface 40, for example, an upper surface and/or a lower surface, that is configured for contacting a neighboring electrical steel lamination 20 when the plurality of electrical steel laminations 20 are stacked adjacent one another to form the lamination stack 18.

As set forth in more detail below, the bridge area 38 has a treated hardness (represented by 42) that is greater than the initial hardness 36, such that the bridge area 38 has a comparatively higher yield strength and ultimate tensile strength and a comparatively lower magnetic permeability than the surrounding first portion 32 and second portion 34. That is, the electrical steel lamination 20 may have an initial magnetic permeability (represented by 44) and only the bridge area 38 may have a treated magnetic permeability (represented by 46) that is less than the initial magnetic permeability 44. Stated differently, the electrical steel lamination 20 is hardened and mechanically strengthened only where necessary, i.e., at only the bridge area 38, while the mechanical and magnetic properties of the electrical steel lamination 20 are maintained elsewhere, e.g., at every location except the bridge area 38.

Figure 3:
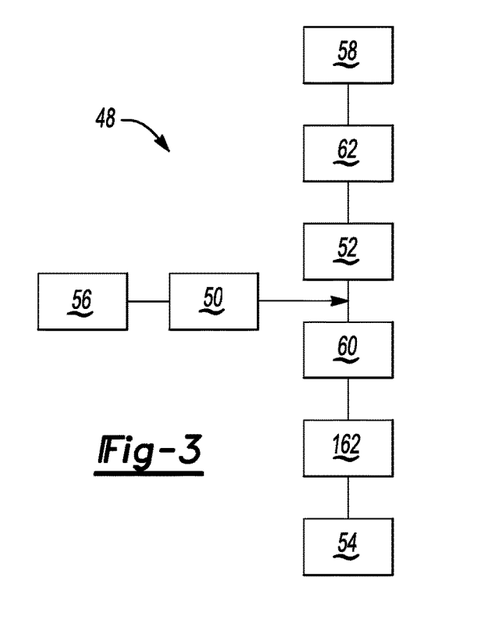
FIG. 3 is a schematic flowchart of a method of forming the rotor of FIG. 1.

Referring now to FIG. 3, a method 48 of forming the rotor 10 of FIG. 1 includes isolating 50 the bridge area 38 of the electrical steel lamination 20. As set forth above and described with reference to FIG. 2A, the bridge area 38 is disposed between the first portion 32 of the electrical steel lamination 20 and the second portion 34 that is adjacent to the first portion 32. Each of the first portion 32, the second portion 34, and the bridge area 38 has the initial hardness 36. Further, the electrical steel lamination 20 has the initial magnetic permeability 44.

Isolating 50 may include locating and selecting the bridge area 38. For example, isolating 50 may include identifying and sequestering the bridge area 38 from the first portion 32 and the second portion 34. For instance, isolating 50 may include masking off the first portion 32 and the second portion 34 from the bridge area 38.

The method 48 also includes, after isolating 50, hardening 52 only the bridge area 38 so that the bridge area 38 has the treated hardness 42 that is greater than the initial hardness 36. That is, the method 48 may include locally hardening 52 the bridge area 38 without hardening 52 the first portion 32 and/or the second portion 34, i.e., without globally hardening the electrical steel lamination 20. The method 48 may therefore include, concurrent to hardening 52, maintaining 62 the initial hardness 36 of the first portion 32 and the second portion 34. Therefore, hardening 52 may include increasing a yield strength and an ultimate tensile strength of only the bridge area 38, i.e., locally mechanically strengthening only the bridge area 38, such that the bridge area 38 has excellent fatigue resistance. As such, the electrical steel lamination 20 may not have a uniform hardness, but may instead be locally-hardened at only the bridge area 38.

The bridge area 38 may be hardened in any suitable manner. For example, the bridge area 38 may be chemically hardened and/or physically hardened. For instance, by way of one non-limiting example, hardening 52 may include nitriding only the bridge area 38 without nitriding the first portion 32 and/or the second portion 34. That is, the method 48 may include heat treating only the bridge area 38 and diffusing nitrogen into the contact surface 40 (FIG. 2A) of the electrical steel lamination 20 to case-harden the contact surface 40 at only the bridge area 38. That is, hardening 52 may include heating the electrical steel lamination 20 in the presence of ammonia or another nitrogen-containing material at only the bridge area 38 to increase the initial hardness 36 and corrosion resistance of the bridge area 38 as compared to the initial hardness 36 and corrosion resistance of the first portion 32 and the second portion 34.

More specifically, nitriding may include ferritic nitriding or ferritic nitrocarburizing. Ferritic nitriding or ferritic nitrocarburizing may be defined as a hardening process that may diffuse nitrogen and carbon into the electrical steel lamination 20 at comparatively low temperatures, e.g., less than about 625° C., generally without quenching. Ferritic nitriding may include salt bath or liquid ferritic nitriding, or controlled or gaseous ferritic nitriding. Alternatively, nitriding may include plasma nitriding only the bridge area 38 without nitriding the first portion 32 and/or the second portion 34. In particular, the contact surface 40 of the electrical steel lamination 20 may be subjected to ionized molecules of a nitriding gas, such as nitrogen and/or hydrogen, at only the bridge area 38 to thereby harden and strengthen the bridge area 38 as compared to the first portion 32 and the second portion 34. That is, hardening 52 may include impinging a plurality of ions with the contact surface 40 at only the bridge area 38.

In another non-limiting example, hardening 52 may include nitrocarburizing only the bridge area 38 without nitrocarburizing the first portion 32 and/or the second portion 34. Nitrocarburizing may be defined as a thermochemical diffusion process in which nitrogen, carbon, and potentially oxygen atoms may diffuse into the contact surface 40 of the electrical steel lamination 20. Such diffusion may generally occur at temperatures below a temperature at which a transformation to austenite occurs in the electrical steel lamination 20. Therefore, referring again to FIG. 3, the method 48 may include preventing 54 a transformation from ferrite to austenite at the first portion 32 and the second portion 34.

In yet another non-limiting example, hardening 52 may include peening only the bridge area 38 without peening the first portion 32 and/or the second portion 34. Peening may be defined as locally working the contact surface 40 of the electrical steel lamination 20 at only the bridge area 38 with a mechanical element, e.g., shot, or with an ultrasonic element, e.g., ultrasonic impulses or needles, to expand the contact surface 40 and induce compressive residual stress to or relieve tensile stress of the contact surface 40. That is, peening may include mechanically peening the contact surface 40 at only the bridge area 38 or ultrasonically peening the contact surface 40 at only the bridge area 38 to increase compressive stress at only the bridge area 38.

In a further example described with reference to FIG. 2B, hardening 52 may include strengthening the bridge area 38 at the end of the slot 26. Alternatively or additionally, hardening 52 may include strengthening the bridge area 38 along a periphery of the slot 26. That is, any of the hardening processes mentioned above may be employed to trace a portion or all of an edge of the slot 26 to thereby only harden the bridge area 38 surrounding all of or a portion of the slot 26 without globally hardening the electrical steel lamination 20. That is, for this example, the bridge area 38 may be defined as a narrow area surrounding all of or a portion of the slot 26.

Referring again to FIG. 3, in another aspect of the method 48, the method 48 may further include applying 56 a reactive material to the contact surface 40 at only the bridge area 38. The reactive material may be a solid compound that may decompose under heat. Although shown in FIG. 3 as occurring prior to isolating 50, it is to be appreciated that applying 56 may occur prior to, concurrent to, or subsequent to isolating 50. Further, the method 48 may include, after applying 56, thermally activating 58 the reactive material.

That is, hardening 52 may include locally pack carburizing the electrical steel lamination 20 at only the bridge area 38. Pack carburizing may be defined as a process in which carbon monoxide that is derived from a solid compound decomposes at the contact surface 40 into carbon and carbon dioxide. The carbon may then be absorbed into the contact surface 40 and the carbon dioxide may react with carbonaceous material present in the solid compound to produce carbon monoxide. The formation of carbon monoxide may be enhanced by energizers or catalysts, such as barium carbonate ($BaCO_3$), calcium carbonate ($CaCO_3$), potassium carbonate ($K_2CO_3$), and sodium carbonate ($Na_2CO_3$), that may be present in the solid compound. These energizers may facilitate the reduction of carbon dioxide with carbon to form carbon monoxide. The pack carburizing may continue as long as enough carbon is present to react with excess carbon dioxide.

Referring again to FIG. 3, the method 48 also includes, concurrent to hardening 52, decreasing 60 the initial magnetic permeability 44 (FIGS. 2A and 2B) at only the bridge area 38. Further, the method 48 may include, concurrent to decreasing 60, maintaining 162 the initial magnetic permeability 44 at the first portion 32 and the second portion 34. That is, the method 48 may include changing the magnetic properties of the electrical steel lamination 20, i.e., magnetically hardening the electrical steel lamination 20, at only the bridge area 38 and not at the first portion 32 and/or the second portion 34. That is, a majority of the electrical steel lamination 20 may remain magnetically soft, while only the bridge area 38 is magnetically hard.

Figure 7:
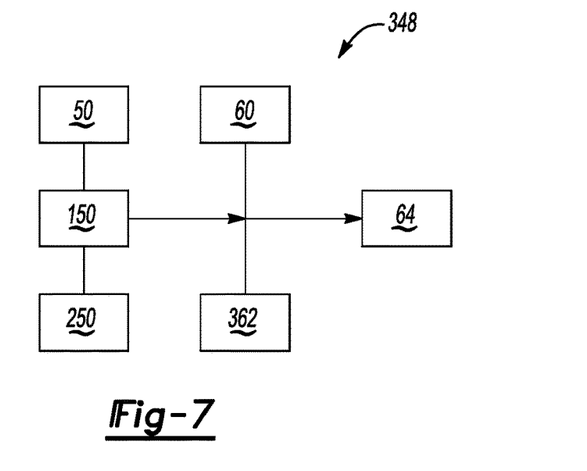
FIG. 7 is a schematic flowchart of an additional example of the method of forming the rotor of FIG. 1.
Figure 8:
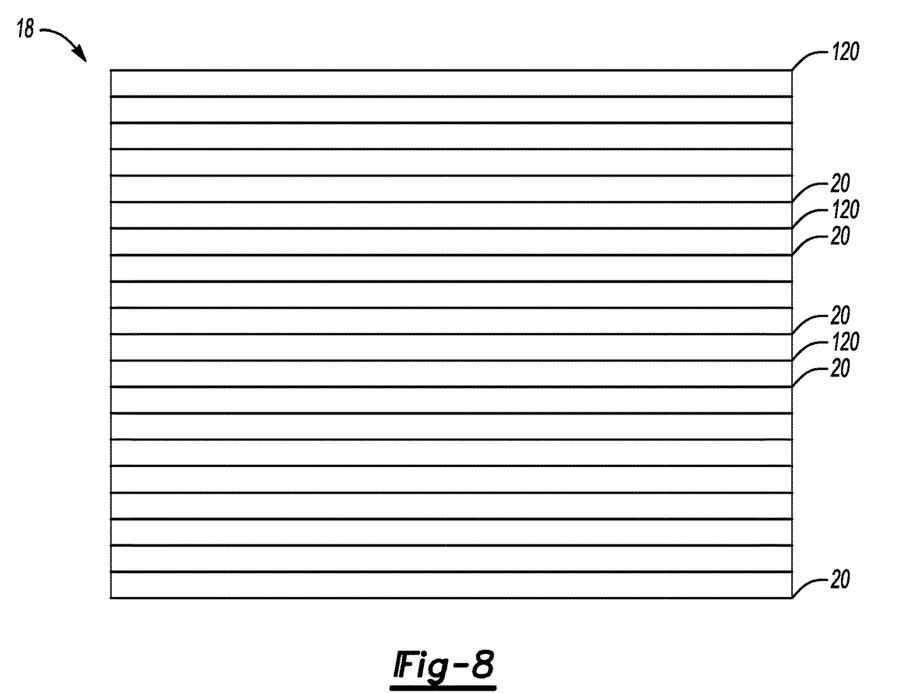
FIG. 8 is a schematic illustration of a cross-sectional view of one example of the lamination stack of FIG. 1, taken along section line 8-8.
Figure 9:
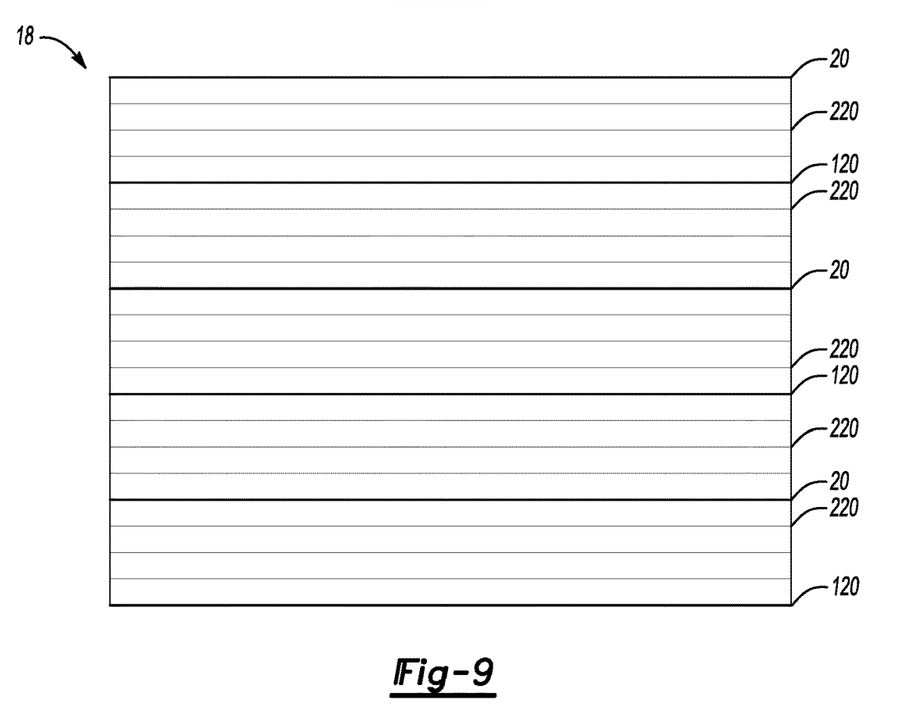
FIG. 9 is a schematic illustration of a cross-sectional view of another example of the lamination stack of FIG. 1, taken along section line 8-8.

Referring now to FIGS. 8 and 9, the lamination stack 18 of the rotor 10 may include a plurality of electrical steel laminations 20 stacked adjacent to one another. For example, the lamination stack 18 may include a first electrical steel lamination 20, a second electrical steel lamination 120, and a third electrical steel lamination 220 stacked between and in contact with the first electrical steel lamination 20 and the second electrical steel lamination 120. A method 148 for forming the rotor 10 including the lamination stack 18 is described with reference to FIGS. 4, 5, and 7.

The method 148 includes isolating 50 a first bridge area 38 of the first electrical steel lamination 20. As described with reference to FIG. 2A, the first bridge area 38 is disposed between a first portion 32 of the first electrical steel lamination 20 and a second portion 34 of the first electrical steel lamination 20 that is adjacent to the first portion 32. Each of the first portion 32, the second portion 34, and the first bridge area 38 has a first initial hardness 36. In addition, the first electrical steel lamination 20 has a first initial magnetic permeability 44.

The method 148 also includes isolating 150 a second bridge area 138 of the second electrical steel lamination 120. The second bridge area 138 is disposed between a third portion 132 of the second electrical steel lamination 120 and a fourth portion 134 of the second electrical steel lamination 120 that is adjacent to the third portion 132. Each of the third portion 132, the fourth portion 134, and the second bridge area 138 has a second initial hardness 136. In addition, the second electrical steel lamination 120 has a second initial magnetic permeability 144.

Isolating 50, 150 may include locating and selecting the first bridge area 38 and the second bridge area 138. For example, isolating 50, 150 may include identifying and sequestering the first bridge area 38 from the first portion 32 and the second portion 34, and identifying and sequestering the second bridge area 138 from the third portion 132 and the fourth portion 134. For example, isolating 50, 150 may include masking off the first portion 32 and the second portion 34 from the first bridge area 38, and masking off the third portion 132 and the fourth portion 134 from the second bridge area 138.

The method 148 further includes, after isolating 50 the first bridge area 38 and the second bridge area 138, hardening 52 only the first bridge area 38 and the second bridge area 138 so that the first bridge area 38 has a first treated hardness 42 that is greater than the first initial hardness 36 and the second bridge area 138 has a second treated hardness 142 that is greater than the second initial hardness 136. That is, the method 148 may include locally hardening 52 the first bridge area 38 and the second bridge area 138 without hardening 52 the first portion 32, the second portion 34, the third portion 132, and/or the fourth portion 134, i.e., without globally hardening the electrical steel lamination 20. The method 48 may therefore include, concurrent to hardening 52, maintaining 62 the first initial hardness 36 of the first portion 32 and the second portion 34, and maintaining 62 the second initial hardness 136 of the third portion 132 and the fourth portion 134. In addition, hardening 52 may include increasing a yield strength and an ultimate tensile strength of only the first bridge area 38 and the second bridge area 138, i.e., locally mechanically strengthening only the first bridge area 38 and the second bridge area 138, such that the first bridge area 38 and the second bridge area 138 have excellent fatigue resistance.

In addition, the method 148 also includes, concurrent to hardening 52, decreasing 60 the first initial magnetic permeability 44 at only the first bridge area 38 and decreasing 60 the second initial magnetic permeability 144 at only the second bridge area 138. Further, although not shown, the method 148 may include, concurrent to decreasing 60, maintaining 162 the first initial magnetic permeability 44 at the first portion 32 and the second portion 34, and maintaining 162 the second initial magnetic permeability 144 at the third portion 132 and the fourth portion 134. That is, the method 148 may include changing the magnetic properties of the first electrical steel lamination 20 and the second electrical steel lamination 120, i.e., magnetically hardening the first and second electrical steel laminations 20, 120, at only the first bridge area 38 and the second bridge area 138, and not at the first portion 32, the second portion 34, the third portion 132, and/or the fourth portion 134. That is, a majority of the first and second electrical steel laminations 20, 120 may remain magnetically soft, while only the first and second bridge areas 38, 138 are magnetically hard.

Figure 4:
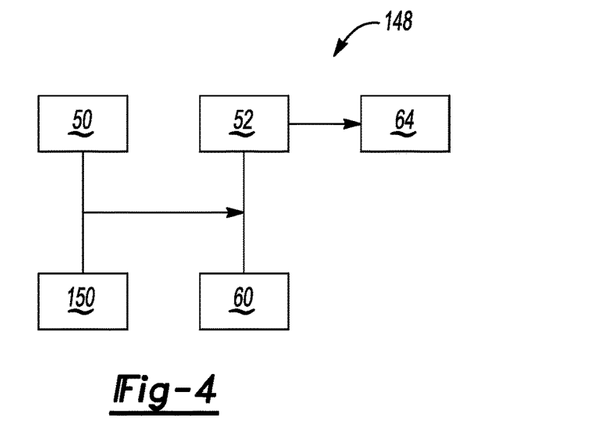
FIG. 4 is a schematic flowchart of another example of the method of forming the rotor of FIG. 1.

Referring now to FIG. 4, in one aspect, the method 148 may also include, after hardening 52, stacking 64 the first electrical steel lamination 20 adjacent and in contact with the second electrical steel lamination 120. That is, the first and second electrical steel laminations 20, 120 may be hardened first before the first and second electrical steel laminations 20, 120 are stacked adjacent one another to form the lamination stack 18.

Figure 5:
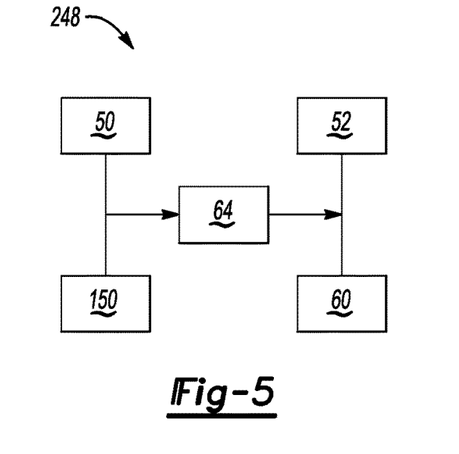
FIG. 5 is a schematic flowchart of a further example of the method of forming the rotor of FIG. 1.

Alternatively, as described with reference to FIG. 5, in another aspect, the method 248 may include, prior to hardening 52, stacking 64 the first electrical steel lamination 20 adjacent and in contact with the second electrical steel lamination 120. That is, the first and second electrical steel laminations 20, 120 may be hardened after the first and second electrical steel laminations 20, 120 are stacked adjacent one another to form the lamination stack 18. Stated differently, the rotor lamination stack 18 may be assembled first, and then the first and second electrical steel laminations 20, 120 may be hardened.

Referring now to FIG. 8, in some examples, every one of the plurality of electrical steel laminations 20 may include the hardened or treated first bridge area 38 or second bridge area 138. That is, the first electrical steel lamination 20 and the second electrical steel lamination 120 may be hardened only at the first bridge area 38 and the second bridge area 138 as described above, such that the first bridge area 38 and the second bridge area 138 are comparatively harder than the remainder of the first electrical steel lamination 20 and the second electrical steel lamination 120, respectively. Therefore, each of the plurality of electrical steel laminations 20, 120 in the lamination stack 18 may be locally hardened.

Figure 6:
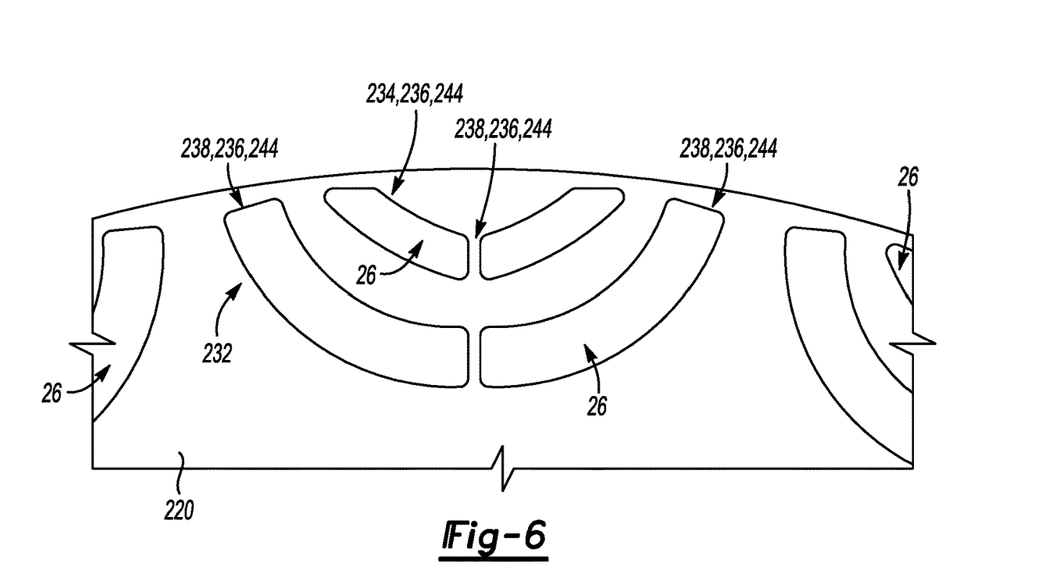
FIG. 6 is a schematic illustration of a top view of a portion of another example of the electrical steel lamination of FIG. 1.

However, referring to FIGS. 6 and 9, in another example, the lamination stack 18 may include one or more electrical steel laminations 220 that are not locally hardened. For example, the lamination stack 18 may include alternating locally-hardened electrical steel laminations 20 and non-locally-hardened electrical steel laminations 220. In another example, the lamination stack 18 may include a repeating pattern of locally-hardened electrical steel laminations 20 and non-locally-hardened electrical steel laminations 220, e.g., every $3^{rd}$ or $5^{th}$ or $10^{th}$ electrical steel lamination 20 may be locally-hardened at only the bridge area 38.

As such, referring to FIG. 7, in another aspect, the method 348 may further include isolating 250 a third bridge area 238 (FIG. 6) of the third electrical steel lamination 220. The third bridge area 238 may be disposed between a fifth portion 232 of the third electrical steel lamination 220 and a sixth portion 234 of the third electrical steel lamination 220 that is adjacent to the fifth portion 232. Each of the fifth portion 232, the sixth portion 234, and the third bridge area 238 may have a third initial hardness 236. In addition, the third electrical steel lamination 220 may have a third initial magnetic permeability 244.

The method 348 may further include maintaining 362 the third initial hardness 236 of the third bridge area 238 by not hardening 52 any of the fifth portion 232, the sixth portion 234, and the third bridge area 238. That is, the third electrical steel lamination 220 may not be locally hardened at the third bridge area 238.

Therefore, the method 348 may also include stacking 64 the third electrical steel lamination 220 between the first electrical steel lamination 20 and the second electrical steel lamination 120 to form the lamination stack 18 that includes one or more non-locally-hardened electrical steel laminations 220 stacked between the first electrical steel lamination 20 and the second electrical steel lamination 120.

As such, the method 48, 148, 248, 348 as described above provides electrical steel laminations 20, 120 and rotors 10 that are not subject to strength-limited design considerations. That is, the method 48, 148, 248, 348 provides rotors 10 with targeted strength at the bridge area 38, 138 without compromising magnetic properties elsewhere. Stated differently, the method 48, 148, 248, 348 strengthens and improves the fatigue resistance of individual electrical steel laminations 20, 120 while maintaining excellent magnetic properties and performance of the rotor 10. The optimized strength at the bridge area 38, 138 generally minimizes deformation of the electrical steel lamination 20, 120 from loads on the bridge area 38, 138 caused by forces acting on the magnets 30 during operation of the rotor 10. Such optimized and local strength and hardness in turn optimizes performance of the rotor 10. In addition, the rotors 10 formed by the method 48, 148, 248, 348 have excellent performance at even high revolution speed, e.g., 15,000 revolutions per minute, which equates to improved rotor performance for a given rotor size. As such, the rotors 10 formed by the method 48, 148, 248, 348 are useful for applications requiring electromagnetic devices 12 having excellent power density.

While the best modes for carrying out the disclosure have been described in detail, those familiar with the art to which this disclosure relates will recognize various alternative designs and embodiments for practicing the disclosure within the scope of the appended claims.

What is claimed is:

1. A method of forming a rotor, the method comprising:
   isolating a bridge area of an electrical steel lamination;
   wherein the bridge area is disposed between:
     a first portion of the electrical steel lamination; and
     a second portion of the electrical steel lamination that is adjacent to the first portion;
   wherein each of the first portion, the second portion, and the bridge area has an initial hardness;
   wherein the electrical steel lamination has an initial magnetic permeability;
   after isolating, hardening only the bridge area so that the bridge area has a treated hardness that is greater than the initial hardness; and
   concurrent to hardening, decreasing the initial magnetic permeability at only the bridge area.

2. The method of claim 1, further including, concurrent to hardening, maintaining the initial hardness of the first portion and the second portion.

3. The method of claim 1, further including, concurrent to decreasing, maintaining the initial magnetic permeability at the first portion and the second portion.

4. The method of claim 1, wherein isolating includes masking off the first portion and the second portion from the bridge area.

5. The method of claim 1, wherein hardening includes increasing a yield strength and an ultimate tensile strength of only the bridge area.

6. The method of claim 1, wherein hardening includes nitriding only the bridge area.

7. The method of claim 6, wherein hardening includes nitrocarburizing only the bridge area.

8. The method of claim 1, wherein the electrical steel lamination has an interior edge and an outer edge spaced apart from the interior edge and further wherein the electrical steel lamination defines a slot therethrough between the interior edge and the outer edge; and
   wherein hardening includes strengthening the bridge area at an end of the slot.

9. The method of claim 8, wherein hardening includes strengthening the bridge area along a periphery of the slot.

10. The method of claim 1, wherein the electrical steel lamination has a contact surface; and
    further including applying a reactive material to the contact surface at only the bridge area.

11. The method of claim 10, further including, after applying, thermally activating the reactive material.

12. The method of claim 1, wherein hardening includes peening only the bridge area.

13. The method of claim 1, wherein the electrical steel lamination has a contact surface; and
    wherein hardening includes impinging a plurality of ions with the contact surface at only the bridge area.

14. The method of claim 1, further including preventing a transformation from ferrite to austenite at the first portion and the second portion.

15. A method of forming a rotor, the method comprising:
    isolating a first bridge area of a first electrical steel lamination;
    wherein the first bridge area is disposed between:
      a first portion of the first electrical steel lamination; and
      a second portion of the first electrical steel lamination that is adjacent to the first portion;
    wherein each of the first portion, the second portion, and the first bridge area has a first initial hardness;
    wherein the first electrical steel lamination has a first initial magnetic permeability;
    isolating a second bridge area of a second electrical steel lamination;
    wherein the second bridge area is disposed between:
      a third portion of the second electrical steel lamination; and
      a fourth portion of the second electrical steel lamination that is adjacent to the third portion;
    wherein each of the third portion, the fourth portion, and the second bridge area has a second initial hardness;
    wherein the second electrical steel lamination has a second initial magnetic permeability;
    after isolating the first bridge area and the second bridge area, hardening only the first bridge area and the second bridge area so that the first bridge area has a first treated hardness that is greater than the first initial hardness and the second bridge area has a second treated hardness that is greater than the second initial hardness; and
    concurrent to hardening, decreasing the first initial magnetic permeability at only the first bridge area and decreasing the second initial magnetic permeability at only the second bridge area.

16. The method of claim 15, further including, after hardening, stacking the first electrical steel lamination adjacent and in contact with the second electrical steel lamination.

17. The method of claim 15, further including, prior to hardening, stacking the first electrical steel lamination adjacent and in contact with the second electrical steel lamination.

18. The method of claim 15, further including, isolating a third bridge area of a third electrical steel lamination;
- wherein the third bridge area is disposed between:
  - a fifth portion of the third electrical steel lamination; and
  - a sixth portion of the third electrical steel lamination that is adjacent to the fifth portion;
- wherein each of the fifth portion, the sixth portion, and the third bridge area has a third initial hardness;
- maintaining the third initial hardness of the third bridge area by not hardening any of the fifth portion, the sixth portion, and the third bridge area; and
- stacking the third electrical steel lamination between the first electrical steel lamination and the second electrical steel lamination.

* * * * *